US006968611B2

(12) United States Patent
Hall et al.

(10) Patent No.: US 6,968,611 B2
(45) Date of Patent: Nov. 29, 2005

(54) INTERNAL COAXIAL CABLE ELECTRICAL CONNECTOR FOR USE IN DOWNHOLE TOOLS

(75) Inventors: David R. Hall, Provo, UT (US); H. Tracy Hall, Jr., Provo, UT (US); David S. Pixton, Lehi, UT (US); Scott Dahlgren, Provo, UT (US); Joe Fox, Spanish Fork, UT (US); Cameron Sneddon, Provo, UT (US); Michael Briscoe, Lehi, UT (US)

(73) Assignee: IntelliServ, Inc., Provo, UT (US)

( * ) Notice: Subject to any disclaimer, the term of this patent is extended or adjusted under 35 U.S.C. 154(b) by 0 days.

(21) Appl. No.: 10/605,911

(22) Filed: Nov. 5, 2003

(65) Prior Publication Data

US 2005/0095827 A1 May 5, 2005

(51) Int. Cl.$^{7}$ .......................... B23P 19/04; E21B 19/16
(52) U.S. Cl. .......................... 29/745; 29/747; 439/578; 166/65.1; 166/380; 175/40
(58) Field of Search ....................... 29/745, 747, 602.1; 439/578; 166/65.1, 66.5, 380; 175/40

(56) References Cited

U.S. PATENT DOCUMENTS

| | | | |
|---|---|---|---|
| 749,633 | A | 1/1904 | Seeley |
| 2,178,931 | A | 11/1939 | Crites et al. |
| 2,197,392 | A | 4/1940 | Hawthorn |
| 2,249,769 | A | 7/1941 | Leonardon |
| 2,301,783 | A | 11/1942 | Lee |
| 2,354,887 | A | 8/1944 | Silverman et al. |
| 2,379,800 | A | 7/1945 | Hare |
| 2,414,719 | A | 1/1947 | Cloud |
| 2,531,120 | A | 11/1950 | Feaster |
| 2,633,414 | A | 3/1953 | Boivinet |
| 2,659,773 | A | 11/1953 | Barney |
| 2,662,123 | A | 12/1953 | Koening, Jr. |
| 2,748,358 | A | 5/1956 | Johnston |
| 2,974,303 | A | 3/1961 | Dixon |
| 2,982,360 | A | 5/1961 | Morton et al. |
| 3,079,549 | A | 2/1963 | Martin |
| 3,090,031 | A | 5/1963 | Lord |
| 3,170,137 | A | 2/1965 | Brandt |
| 3,186,222 | A | 6/1965 | Martin |
| 3,194,886 | A | 7/1965 | Mason |
| 3,209,323 | A | 9/1965 | Grossman, Jr. |
| 3,227,973 | A | 1/1966 | Gray |

(Continued)

FOREIGN PATENT DOCUMENTS

EP 0399987 A1 11/1990

(Continued)

*Primary Examiner*—A. Dexter Tugbang
(74) *Attorney, Agent, or Firm*—Jeffery E. Daly

(57) ABSTRACT

A coaxial cable electrical connector more specifically an internal coaxial cable connector placed within a coaxial cable and its constituent components. A coaxial cable connector is in electrical communcation with an inductive transformer and a coaxial cable. The connector is in electrical communication with the outer housing of the inductive transfonner. A generally coaxial center conductor, a portion of which could be the coil in the inductive transformer, passes through the connector, is electrically insulated from the connector, and is in electrical communication with the conductive care of the coaxial cable. A plurality of bulbous pliant tabs on the coaxial cable connector mechanically engage the inside diameter of the coaxial cable thus grounding the transformer to the coaxial cable. The coaxial cable and inductive transformer are disposed within downhole tools to transmit electrical signals between downhole tools within a drill string.

13 Claims, 9 Drawing Sheets

U.S. PATENT DOCUMENTS

| | | | | |
|---|---|---|---|---|
| 3,253,245 | A | | 5/1966 | Brandt |
| 3,518,608 | A | | 6/1970 | Papadopoulos |
| 3,696,332 | A | | 10/1972 | Dickson, Jr. et al. |
| 3,793,632 | A | | 2/1974 | Still |
| 3,807,502 | A | | 4/1974 | Heilhecker et al. |
| 3,879,097 | A | | 4/1975 | Oertle |
| 3,930,220 | A | | 12/1975 | Shawhan |
| 3,957,118 | A | | 5/1976 | Barry et al. |
| 3,989,330 | A | | 11/1976 | Cullen et al. |
| 4,012,092 | A | | 3/1977 | Godbey |
| 4,087,781 | A | | 5/1978 | Grossi et al. |
| 4,095,865 | A | | 6/1978 | Denison et al. |
| 4,121,193 | A | | 10/1978 | Denison |
| 4,126,848 | A | | 11/1978 | Denison |
| 4,215,426 | A | | 7/1980 | Klatt |
| 4,220,381 | A | | 9/1980 | Van der Graaf |
| 4,348,672 | A | | 9/1982 | Givler |
| 4,445,734 | A | | 5/1984 | Cunningham |
| 4,496,203 | A | | 1/1985 | Meadows |
| 4,537,457 | A | | 8/1985 | Davis, Jr. et al. |
| 4,578,675 | A | | 3/1986 | MacLeod |
| 4,605,268 | A | | 8/1986 | Meador |
| 4,660,910 | A | | 4/1987 | Sharp et al. |
| 4,683,944 | A | | 8/1987 | Curlett |
| 4,698,631 | A | | 10/1987 | Kelly, Jr. et al. |
| 4,716,960 | A | * | 1/1988 | Eastlund et al. ....... 166/65.1 X |
| 4,722,402 | A | | 2/1988 | Weldon |
| 4,785,247 | A | | 11/1988 | Meador et al. |
| 4,788,544 | A | | 11/1988 | Howard |
| 4,806,928 | A | | 2/1989 | Veneruso |
| 4,884,071 | A | | 11/1989 | Howard |
| 4,901,069 | A | | 2/1990 | Veneruso |
| 4,914,433 | A | | 4/1990 | Galle |
| 4,924,949 | A | | 5/1990 | Curlett |
| 5,008,664 | A | | 4/1991 | More et al. |
| 5,052,941 | A | | 10/1991 | Hernandez-Marti et al. |
| 5,148,408 | A | | 9/1992 | Matthews |
| 5,248,857 | A | | 9/1993 | Ollivier |
| 5,278,550 | A | * | 1/1994 | Rhein-Knudsen et al. 175/40 X |
| 5,302,138 | A | | 4/1994 | Shields |
| 5,311,661 | A | | 5/1994 | Zifferer |
| 5,332,049 | A | | 7/1994 | Tew |
| 5,334,801 | A | | 8/1994 | Mohn |
| 5,371,496 | A | | 12/1994 | Tanamachi |
| 5,454,605 | A | | 10/1995 | Mott |
| 5,455,573 | A | | 10/1995 | Delatorre |
| 5,505,502 | A | | 4/1996 | Smith et al. |
| 5,517,843 | A | | 5/1996 | Winship |
| 5,521,592 | A | | 5/1996 | Veneruso |
| 5,568,448 | A | | 10/1996 | Tanigushi et al. |
| 5,650,983 | A | | 7/1997 | Kondo et al. |
| 5,691,712 | A | | 11/1997 | Meek et al. |
| 5,743,301 | A | | 4/1998 | Winship |
| RE35,790 | E | | 5/1998 | Pustanyk et al. |
| 5,810,401 | A | | 9/1998 | Mosing et al. |
| 5,833,490 | A | | 11/1998 | Bouldin |
| 5,853,199 | A | | 12/1998 | Wilson |
| 5,856,710 | A | | 1/1999 | Baughman et al. |
| 5,898,408 | A | | 4/1999 | Du |
| 5,908,212 | A | | 6/1999 | Smith et al. |
| 5,924,499 | A | | 7/1999 | Birchak et al. |
| 5,942,990 | A | | 8/1999 | Smith et al. |
| 5,955,966 | A | | 9/1999 | Jeffryes et al. |
| 5,959,547 | A | | 9/1999 | Tubel et al. |
| 5,971,072 | A | | 10/1999 | Huber et al. |
| 6,030,004 | A | | 2/2000 | Schnock et al. |
| 6,041,872 | A | | 3/2000 | Holcomb |
| 6,045,165 | A | | 4/2000 | Sugino et al. |
| 6,046,685 | A | | 4/2000 | Tubel |
| 6,057,784 | A | | 5/2000 | Schaaf et al. |
| 6,104,707 | A | | 8/2000 | Abraham |
| 6,108,268 | A | | 8/2000 | Moss |
| 6,123,561 | A | | 9/2000 | Turner et al. |
| 6,141,763 | A | | 10/2000 | Smith et al. |
| 6,173,334 | B1 | | 1/2001 | Matsuzaki et al. |
| 6,177,882 | B1 | | 1/2001 | Ringgenberg et al. |
| 6,188,223 | B1 | | 2/2001 | van Steenwyk et al. |
| 6,196,335 | B1 | | 3/2001 | Rodney |
| 6,209,632 | B1 | | 4/2001 | Holbert et al. |
| 6,223,826 | B1 | | 5/2001 | Chau et al. |
| 6,367,565 | B1 | | 4/2002 | Hall |
| 6,392,317 | B1 | | 5/2002 | Hall et al. |
| 6,405,795 | B2 | | 6/2002 | Holbert et al. |
| 6,641,434 | B2 | | 11/2003 | Boyle et al. |
| 6,655,464 | B2 | | 12/2003 | Chau et al. |
| 6,670,880 | B1 | | 12/2003 | Hall et al. |
| 6,844,498 | B2 | | 1/2005 | Hall et al. |
| 2002/0135179 | A1 | | 9/2002 | Boyle et al. |
| 2002/0193004 | A1 | | 12/2002 | Boyle et al. |
| 2003/0070842 | A1 | | 4/2003 | Bailey et al. |
| 2003/0213598 | A1 | | 11/2003 | Hughes |
| 2004/0150532 | A1 | | 8/2004 | Hall et al. |

FOREIGN PATENT DOCUMENTS

| | | | | |
|---|---|---|---|---|
| JP | 55-55717 | * | 4/1980 | ............... 175/40 X |
| WO | W8801096 | | 2/1988 | |
| WO | WO9014497 | | 11/1990 | |
| WO | WO 02/06716 A1 | | 1/2002 | |

* cited by examiner

INTERNAL COAXIAL CABLE ELECTRICAL CONNECTOR FOR USE IN DOWNHOLE TOOLS

FEDERAL RESEARCH STATEMENT

This invention was made with government support under Contract No. DE-FC26-01NT41229 awarded by the U.S. Department of Energy. The government has certain rights in the invention.

This invention was made with government support under Contract No. DE-FC26-97FT343656 awarded by the U.S. Department of Energy. The government has certain rights in the invention.

BACKGROUND OF INVENTION

The present invention relates to the field of electrical connectors, particularly internal electrical connectors for coaxial cables. The preferred electrical connectors are particularly well suited for use in difficult environments wherein it is desirable to electrically connect inside a coaxial cable without the normal means available such as BNC, RCA, SMA, SMB, and TNC type coaxial connectors. One such application is in data transmission systems suitable for downhole environments, such as along a drill string used in oil and gas exploration or along the casings and other equipment used in oil and gas production.

The goal of accessing data from a drill string has been expressed for more than half a century. As exploration and drilling technology has improved, this goal has become more important in the industry for successful oil, gas, and geothermal well exploration and production. For example, to take advantage of the several advances in the design of various tools and techniques for oil and gas exploration, it would be beneficial to have real time data such as temperature, pressure, inclination, salinity, etc. Several attempts have been made to devise a successful system for accessing such drill string data. One such system is disclosed in co-pending U.S. application Ser. No. 09/909,469 (also published as PCT Application WO 02/06716) which is assigned to the same assignee as the present invention.

A typical drill string is comprised of several hundred sections of downhole tools such as pipe, heavy weight drill pipe, jars, drill collars, etc. Therefore it is desirable to locate the electrical system within each downhole tool and then make electrical connections when the sections are joined together. One problem for such systems is that the downhole environment is quite harsh. The drilling mud pumped through the drill string is abrasive, slightly basic or alkaline, and typically has a high salt content. In addition, the downhole environment typically involves high pressures and temperatures. Moreover, heavy grease is typically applied at the joints between pipe sections. Consequently, the reliance on an electrical contact between joined pipe sections is typically fraught with problems.

One solution to this problem common in the drilling industry is mud pulse telemetry. Rather than using electrical connections, mud pulse telemetry transmits information in the form of pressure pulses through drilling mud circulating through the drill string and borehole. However, data rates of mud pulse telemetry are very slow compared to data rates needed to provide real-time data from downhole tools.

For example, mud pulse telemetry systems often operate at data rates less than 10 bits per second. Since drilling equipment is often rented and very expensive, even slight mistakes incur substantial expense. Part of the expense can be attributed to time-consuming operations that are required to retrieve downhole data or to verify low-resolution data transmitted to the surface by mud pulse telemetry. Often, drilling or other procedures are halted while crucial data is gathered.

Moreover, the harsh working environment of downhole tools may cause damage to data transmission elements. Furthermore, since many downhole tools are located beneath the surface of the ground, replacing or servicing data transmission tools may be costly, impractical, or impossible. Thus, robust and environmentally hardened data transmission tools are needed to transmit information between downhole tools.

Downhole data transmission systems require reliable and robust electrical connections to insure that quality data signals are received at the top of the borehole.

SUMMARY OF INVENTION

The present invention is an internal electrical connector used within an electrical transmission line particularly a coaxial cable. The invention is useful for making reliable connections inside a coaxial cable affixed to a downhole tool for use in a data transmission system.

An object of this invention is to provide for a reliable coaxial electrical connection between an electrical transmission line and a communications element. For example a coaxial cable disposed within a downhole tool, such as a drill pipe, and an inductive transformer housed within a tool joint end of the drill pipe. Downhole information collected at the bottom of the borehole and other locations along the drill string is then sent up through the data transmission system along the drill string to the drilling rig in order to be analyzed. A data transmission system utilizing such an electrical connector can perform with increased robustness and has the further advantage of being coaxial.

Data received along the drill string employing such a data transmission system will decrease the likelihood of bit errors and overall failure. In this manner, information on the subterranean conditions encountered during drilling and on the condition of the drill bit and other downhole tools may be communicated to the technicians located on the drilling platform. Furthermore, technicians on the surface may communicate directions to the drill bit and other downhole devices in response to the information received from the sensors, or in accordance with the pre-determined parameters for drilling the well.

Another aspect of the invention includes a downhole tool that includes a coaxial cable, an inductive transformer, and a coaxial cable connector coupling both together. Each component is disposed in a downhole tool for use along a drill string.

In accordance with still another aspect of the invention, the system includes a plurality of downhole tools, such as sections of pipe in a drill string. Each tool has a first and second end, with a first communication element located at the first end and a second communication element located at the second end. The system also includes a coaxial cable running between the first and second communication elements, the coaxial cable having a conductive tube and a conductive core within it. The system also includes a first and second connector for connecting the first and second communication elements respectively to the coaxial cable. The first connector is in electrical communication with the first communication element, the second connector is in electrical communication with the second communication element, and the conductive tube is in electrical communication with both the first connector of the first communication element and the second connector of the second communication element.

In accordance with another aspect of the invention, the downhole tools may be sections of drill pipe, each having a central bore, and the first and second communication elements are located in a first and second recess respectively at each end of the drill pipe. The system further includes a first passage passing between the first recess and the central bore and a second passage passing between the second recess and the central bore. The first and second connectors are located in the first and second passages respectively. Preferably, each section of drill pipe has a portion with an increased wall thickness at both the box end and the pin end with a resultant smaller diameter of the central bore at the box end and pin end, and the first and second passages run through the portions with an increased wall thickness and generally parallel to the longitudinal axis of the drill pipe. The box end and pin end is also sometimes referred to as the box end tool joint and pin end tool joint.

In accordance with another aspect of the invention, the communications element may be an inductive transformer embedded in a generally cylindrical body. An outer housing and a coil comprise the inductive transformer with a terminating end of the coil in electrical communication with the outer housing. One means of creating the electrical communication between the coil and the outer housing is by welding the terminating end of the coil to the outer housing. The inductive transformer is also placed in electrical communication with the coaxial connector. For example the coaxial connector can also be welded to the outer housing thus providing reliable electrical communication between the coaxial connector and the inductive transformer.

An intermediate center conductor passes through the coaxial connector and is electrically insulated from the connector. The center conductor is placed in electrical communication with both the inductive transformer and the conductive core of the coaxial cable. The connector has a means for electrically communicating with the inner diameter of the coaxial cable, thus providing a ground connection between the inductive transformer and the coaxial cable, as will be discussed.

Another aspect of the invention is to provide reliable electrical connection between data transmission system tools for a power and carrier signal that is resistant to the flow of drilling fluid, drill string vibrations, and electronic noise associated with drilling oil, gas, and geothermal wells.

In accordance with another aspect of the invention, the system includes a coaxial cable with a conductive tube and core within it, a coaxial connector is placed within the conductive tube. The ground connection is made between the coil in the inductive transformer and the coaxial connector by welding a terminating end of the coil to the connector. The intermediate center conductor is electrically insulated as it passes through the connector and is placed in electrical contact with the conductive core of the coaxial cable.

In accordance with the invention an electrical signal is passed through the conductive tube of the coaxial cable, through the intermediate center conductor within the coaxial connector, and through the coil in the inductive transformer. The grounded return path passes through the terminating end of the coil in the inductive transformer, through the coaxial connector, and to the conductive tube of the coaxial cable.

In accordance with another aspect of the invention, the method of assembly of these tools includes welding a coaxial connector to the outer housing of an inductive transformer, welding a terminating portion of the inductive transformer coil to the outer housing, passing an intermediate center conductor that is a portion of the coil through the conductive transformer, and finally pushing the coaxial connector into a coaxial cable end thereby making electrical contact with both the conductive tube and core of the coaxial cable.

In accordance with another aspect of the invention, the tools are sections of drill pipe, drill collars, jars, and similar tools that would be typically found in a drill string. A plurality of communications elements and electrical transmission tools are disposed within each tool along a drill string. The communications elements and electrical transmission tools are in electrical communication via internal coaxial cable connectors It should be noted that, as used herein, the term "downhole" is intended to have a relatively broad meaning, including such environments as drilling in oil and gas, gas and geothermal exploration, the systems of casings and other equipment used in oil, gas and geothermal production.

It should also be noted that the term "transmission" as used in connection with the phrase data transmission or the like, is intended to have a relatively broad meaning, referring to the passage of signals in at least one direction from one point to another.

BRIEF DESCRIPTION OF DRAWINGS

The present invention, together with attendant objects and advantages, will be best understood with reference to the detailed description below in connection with the attached drawings.

DETAILED DESCRIPTION

Figure 1:
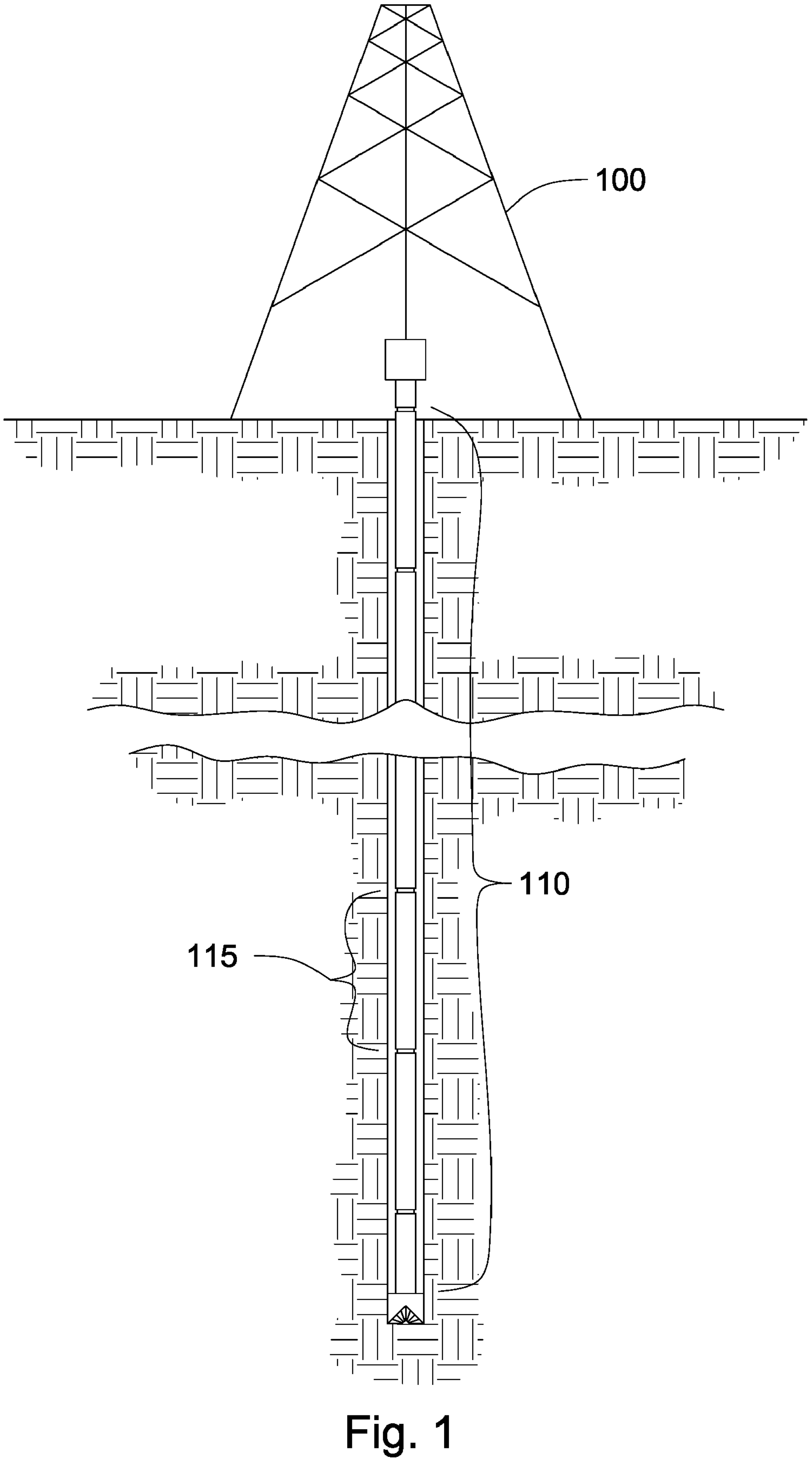
FIG. 1 is a schematic representation of a drill string in a borehole as used on a drilling rig including downhole tools.

Referring to the drawings, FIG. 1 is a schematic representation of a drill string 110 in a borehole as used on a drilling rig 100 including drilling tools 115. Some examples of drilling tools are drill collars, jars, heavy weight drill pipe, drill bits, and of course drill pipe.

Figure 2:
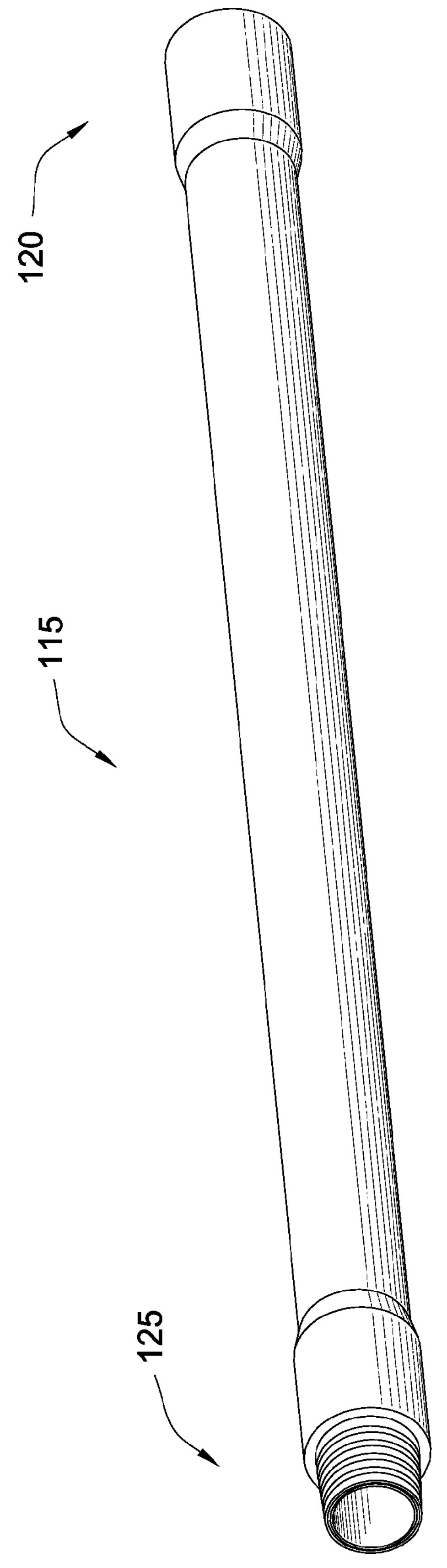
FIG. 2 is a drill pipe, a typical example of a downhole tool including tool joint sections.

FIG. 2 shows one example of a drilling tool, a drill pipe 115 including a box end tool joint 120, and pin end tool joint 125. Tool joints are attached to the tool and provide threads (or other devices) for attaching the tools together, and to allow a high torque to be applied to resist the forces present when making up a drill string or during drilling. Between the pin end 125 and box end 120 is the body of the drill pipe section. A typical length of the body is between 30 and 90 feet. Drill strings in oil and gas production can extend as long as 20,000 feet, which means that as many as 700 sections of drill pipe and downhole tools can be used in the drill string.

Figure 3:
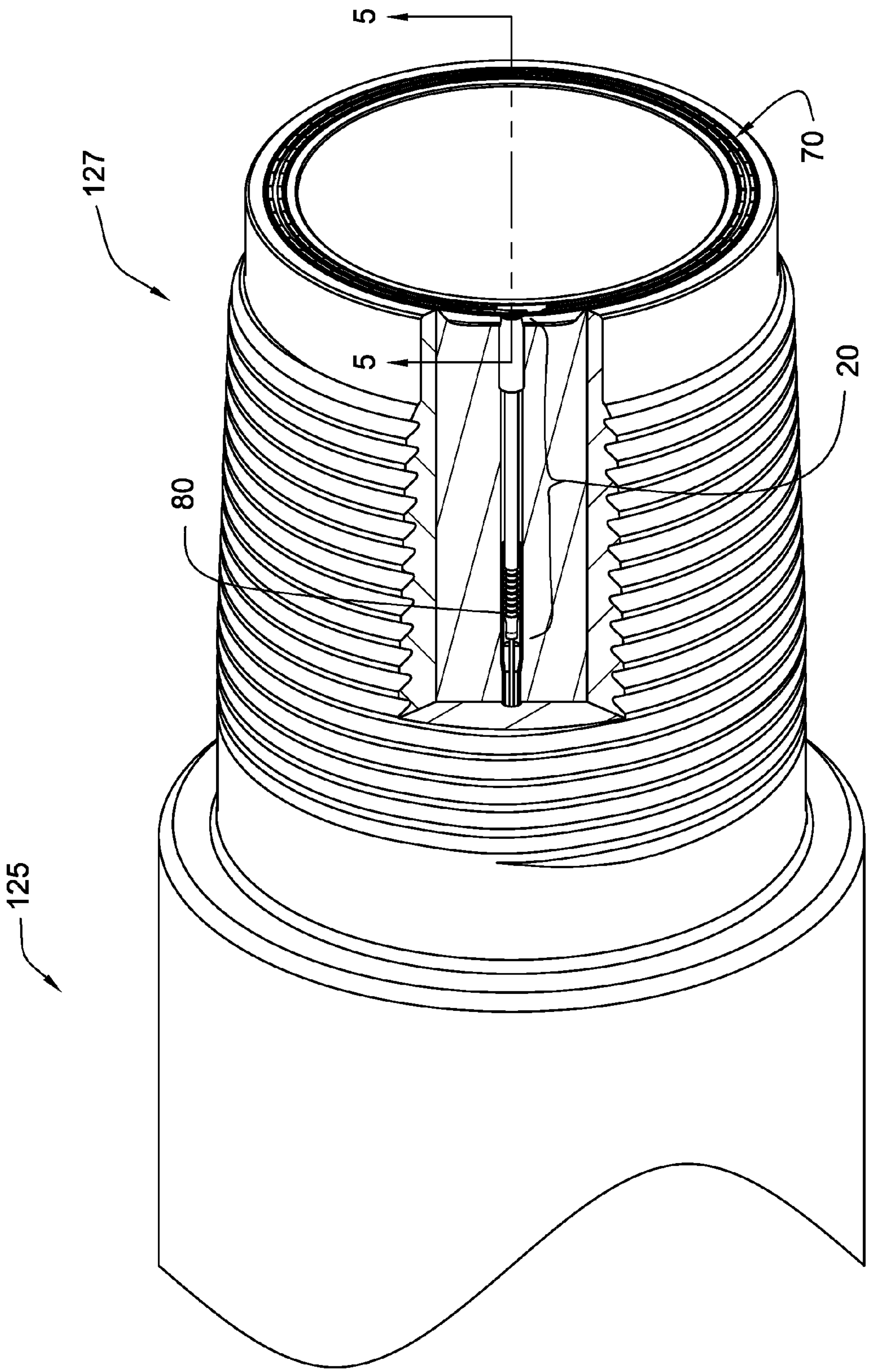
FIG. 3 is a close up of a partial cross sectional view of the pin nose of the pin end tool joint of FIG. 2.

A close up of pin end tool joint 125 is shown in FIG. 3. A coaxial cable connector 20 is shown in the partial cross section of the pin nose 127 as it is disposed in the pin nose of the pin end tool joint 125. A coaxial cable 80 is disposed within the drill pipe running along the longitudinal axis of the drill pipe 115. The coaxial cable 80 includes a conductive tube 83 and a conductive core 85 within it. A communications element such as an inductive transformer 70 is disposed in the pin nose 127 of pipe 115 the detail of which will be shown in the remaining figures. A similar arrangement of the inductive transformer, coaxial cable, and coaxial cable connector may be in the box end 120 of pipe 115.

In a preferred embodiment the drill pipe includes tool joints as depicted in FIG. 2. However, a drill pipe without a tool joint can also be modified to house the coaxial cable and inductive transformer; thus tool joints are not necessary for the invention. The coaxial cable 80 and inductive transformer 70 could be disposed in other downhole tools such drill collars, jars, and similar tools that would be typically found in a drill string. Additionally the coaxial cable 80 could be disposed within other downhole components used in oil and gas or geothermal exploration through which it would be advantageous to transmit an electrical signal and thus necessitate an electrical connector.

The conductive tube 83 is preferably made of metal, more preferably a strong metal, most preferably steel. By "strong metal" it is meant that the metal is relatively resistant to deformation in its normal use state. The metal is preferably stainless steel, most preferably 316 or 316L stainless steel. A preferred supplier of stainless steel is Plymouth Tube, Salisbury, Md.

In an alternative embodiment, the conductive tube 83 may be insulated from the pipe in order to prevent possible galvanic corrosion. At present, the preferred material with which to insulate the conductive tube 83 is PEEK®.

Figure 4:
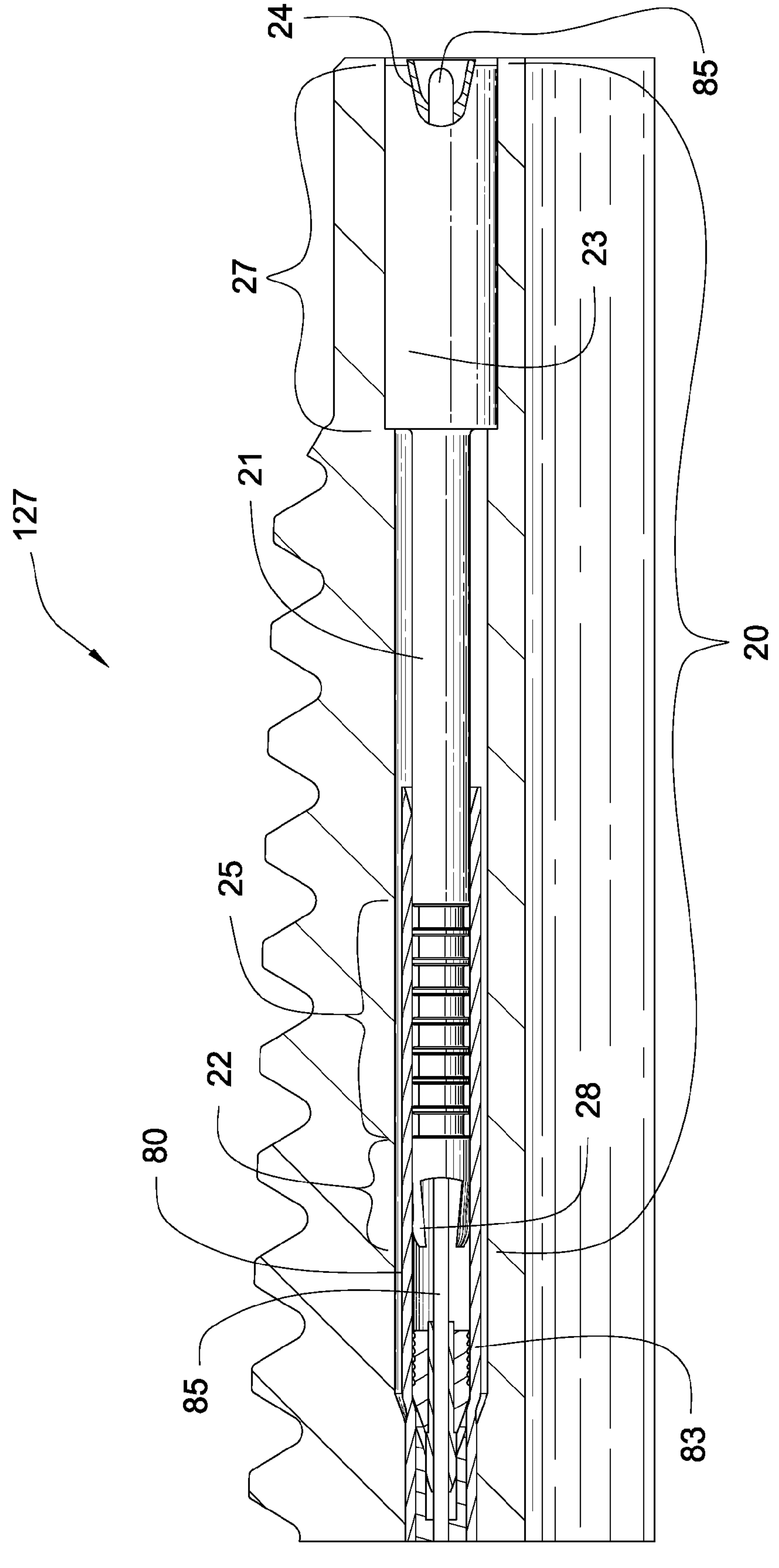
FIG. 4 is a cross sectional view of the pin nose of the pin end tool joint along the lines 55 of FIG. 3.

With reference now to FIG. 4 of the present invention which is a cross sectional view of the pin nose 127 of pin end tool joint 125 along lines 55 in FIG. 3, the placement of the coaxial cable connector will be described. The pin nose 127 includes a bore within the pin nose annular wall for placing the coaxial cable 80. The coaxial cable connector 20 is placed in the bore with the second end 22 placed inside the conductive tube 83 of coaxial cable 80. The second end 22 is in electrical communication with the conductive tube 83 of the coaxial cable. One means of electrical communication is to use bulbous pliant tabs 28. Electrical communication is insured by constructing the bulbous portion of the pliant tabs with a larger diameter than the inside diameter of the conductive tube 83 of coaxial cable 80. Upon insertion the bulbous pliant tabs 28 of the second end 22 deflect with the resultant spring force of the tabs causing them to contact the inside diameter of the conductive tube 83 and thus provide electrical communication between the coaxial cable connector and the coaxial cable 80.

Turning again to FIG. 4 we see the tube 21 of coaxial cable connector 20 with a first end 27 and second end 22. An embankment of grooves 25 along the tube 21 can employ a seal mechanism, such as an o-ring. The seal mechanism is used to shield the internal diameter of the coaxial cable 80 from drilling fluid and other contaminants. A head 23 is located on the first end 27 and positioned nearest the face of the pin nose 127. An inductive transformer is placed in a groove formed in the pin nose 127. The head 23 is in electrical communication with the inductive transformer. One means of electrical communication is by placing the inductive transformer in a saddle 24 in the head 23 and welding the two together, the detail of which will be depicted and described in the drawings below.

A generally coaxial center conductive core 85 passes through the coaxial cable connector. The center conductor is electrically insulated from the head 23, tube 21, and second end 22 as it passes through the coaxial cable connector. The means of electrically insulating the center conductor as it passes through the coaxial cable connector can also be employed to seal between the same, thus safeguard the inner portion of the coaxial connector form drilling fluid and other contaminants. The inductive transformer is in electrical communication with the center conductive core 85 as well as the conductive core of the coaxial cable 80. The arrangement and features of the coaxial cable connector as described above renders the electrical connection between both the coaxial cable 80 and the inductive transformer a coaxial arrangement.

Figure 6:
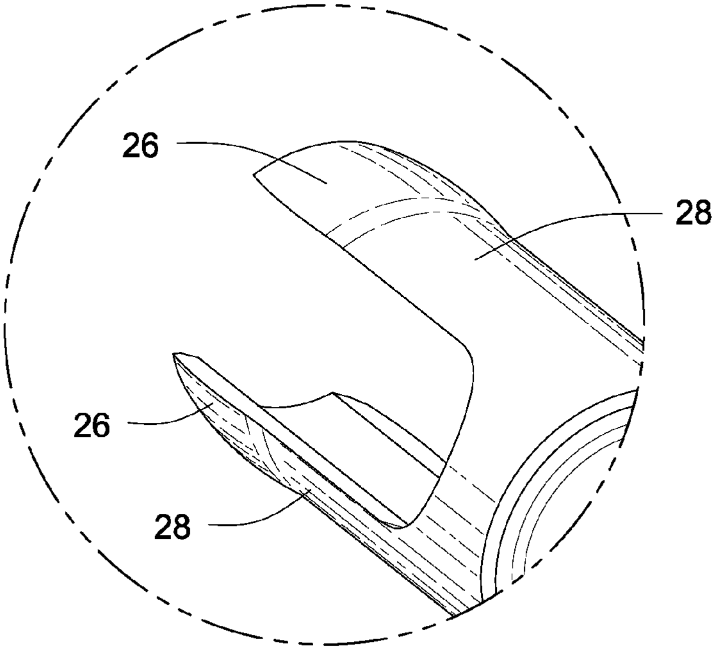
FIG. 6 is a close up view of the second end of the coaxial cable connector.
Figure 5:
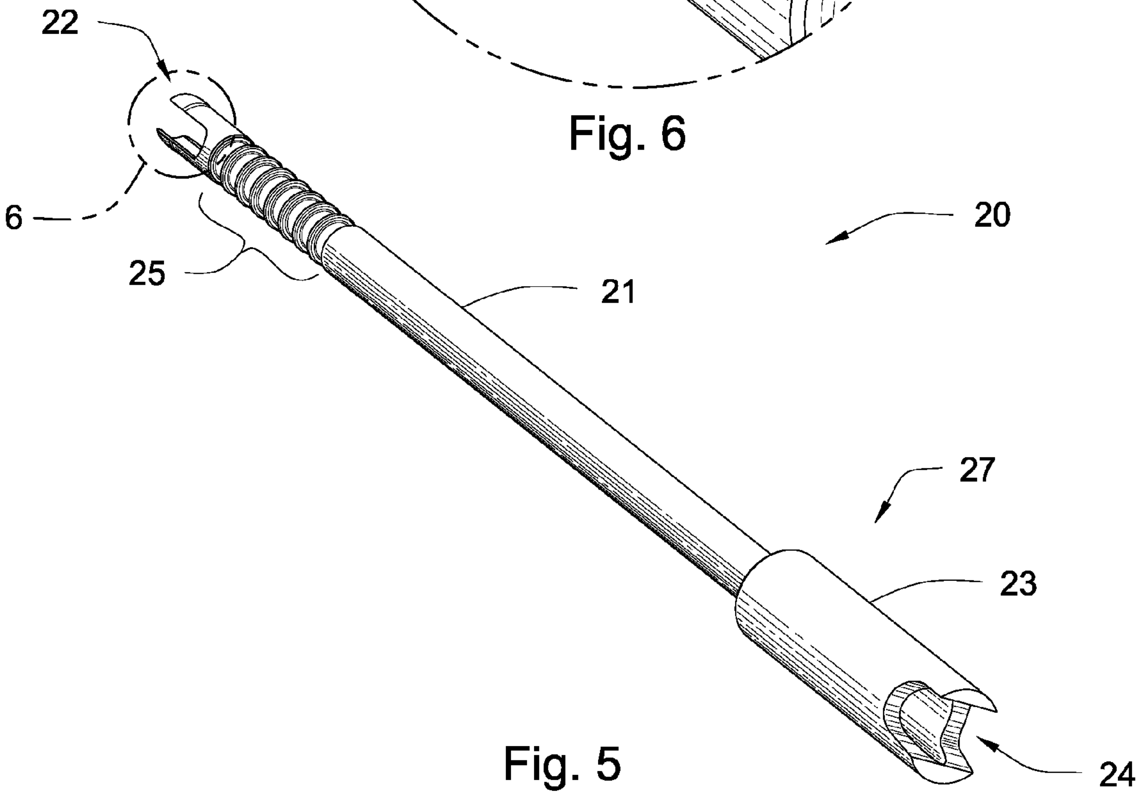
FIG. 5 is a perspective view of a coaxial cable connector as found in the pin nose of the pin end tool joint of FIG. 4.

Various embodiments of the coaxial cable connector are shown in FIGS. 5 and 6. FIG. 5 is a perspective view of the coaxial cable connector and illustrates the features of the coaxial cable connector as depicted in FIG. 4 and described above. The coaxial cable connector 20 includes a tube 21 with a first end 27 and a second end 22. A head 23 is on the first end 27 which includes a saddle 24. The saddle 24 is shaped to conform to the outer housing of the inductive transformer. Grooves 25 for placing sealing components therein are formed along tube 21. A second end 22 of tube 21 is shown in close up 6. FIG. 6 shows the pliant tabs 28 of the second end 22. A plurality of pliant tabs may be utilized as necessary to insure electrical communication with the conductive tube 83 as the coaxial cable is inserted.

Also shown in FIG. 6 is the bulbous portion 26 of pliant tabs 28. It is desirable for the bulbous portion 26 of the pliant tabs 28 to be larger in diameter than the internal diameter of the conductive tube 83 of the coaxial cable 80 into which the connector will be inserted. The diametrical interference between the bulbous region of the pliant tabs and the internal diameter of the coaxial cable 80 cause the tabs to deflect. The tabs are then in compression and constant contact with the internal diameter of the coaxial cable 80 thus further insuring the electrical communication between connector and the coaxial cable.

The coaxial cable connector is preferably constructed of a hard material that is electrically conductive such as certain metals. The metals could be steel, titanium, chrome, nickel, aluminum, iron, copper, tin, and lead. The various types of steel employed could be viscount 44, D2, stainless steel, tool steel, and 4100 series steels. Viscount 44 however is the most preferable material out of which to construct the coaxial cable connector.

Figure 7:
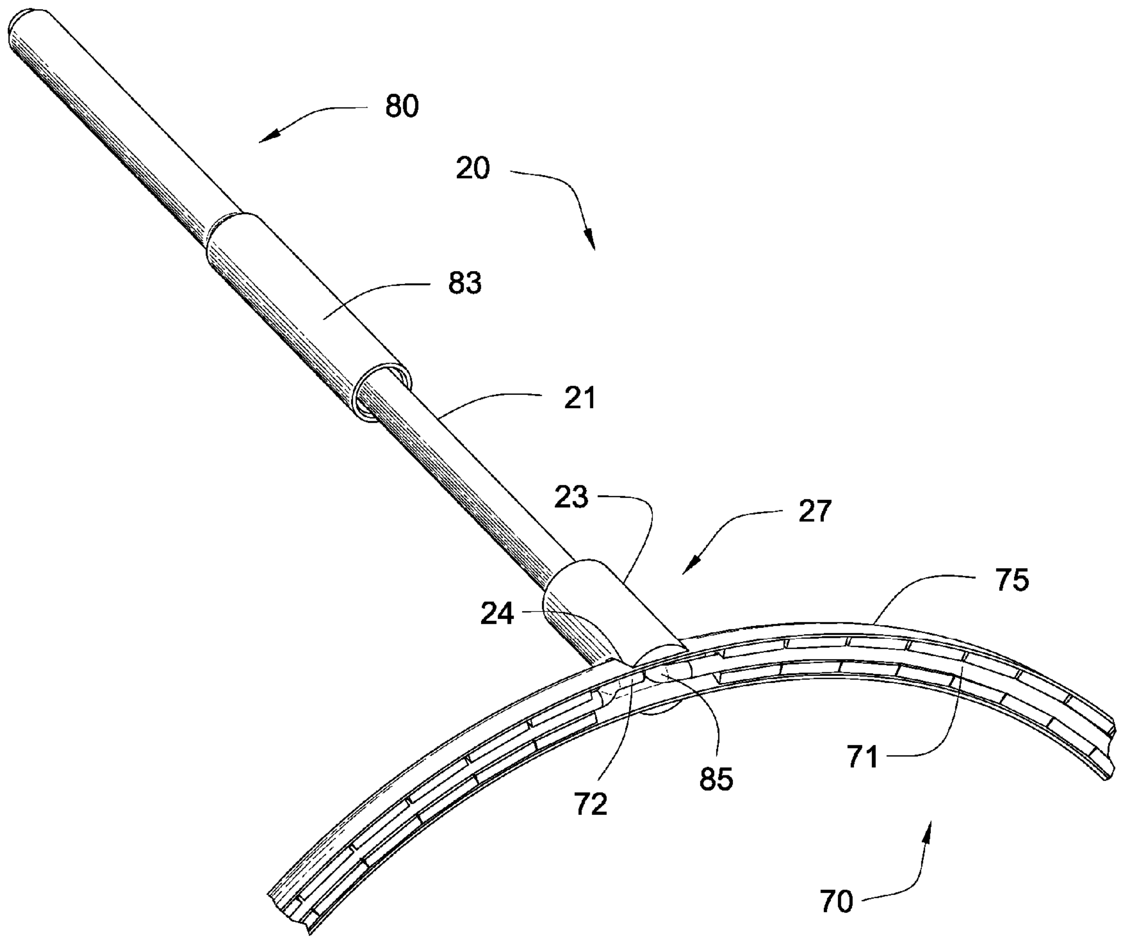
FIG. 7 is a perspective view showing the coaxial cable connector with an inductive transformer and a coaxial cable.
Figure 8:
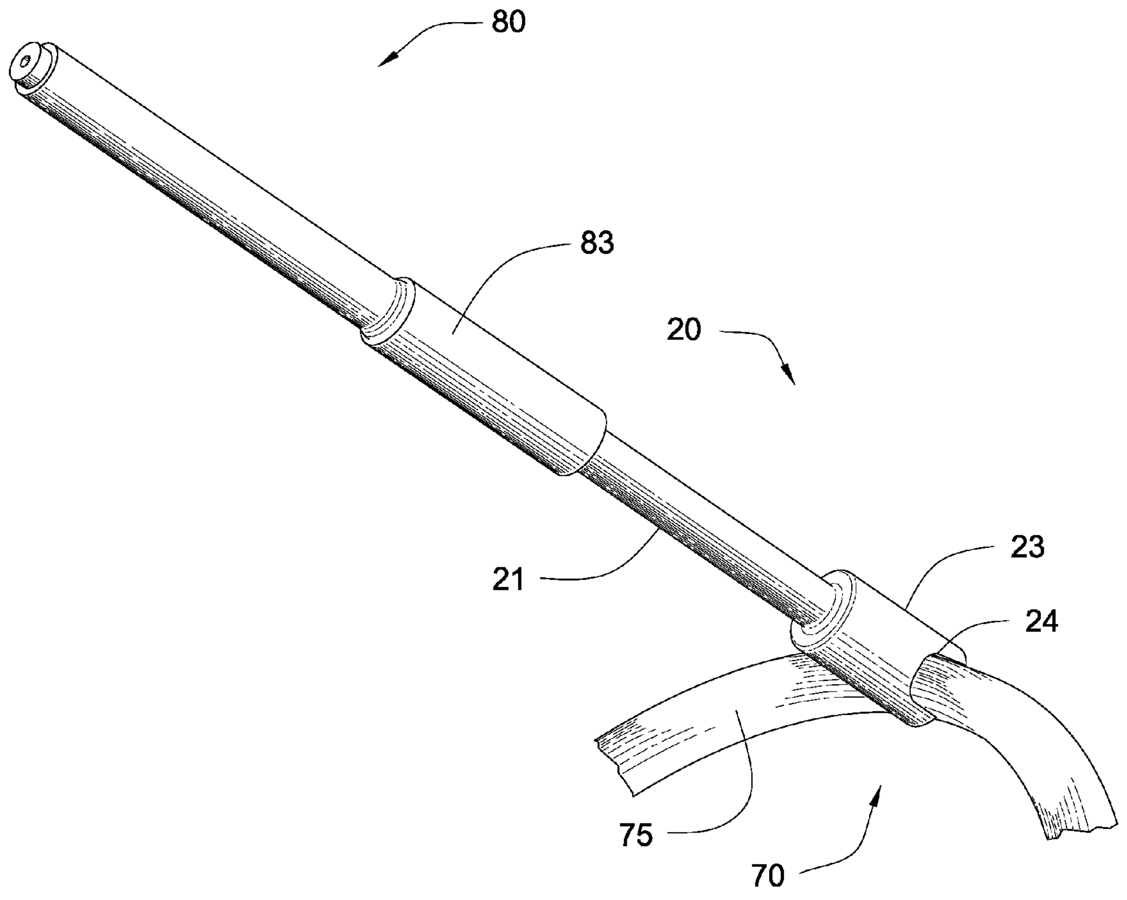
FIG. 8 is a perspective view from the underside of FIG. 7.

FIGS. 7 and 8 shows how the coaxial cable 80 and the inductive transformer are coupled using the most preferred embodiment of the coaxial cable connector. For the purpose of clarity in how the components are assembled when in operation, the downhole tool, into which each component is placed, is not shown.

FIG. 7 is a perspective view of the inductive transformer, coaxial cable connector, and the coaxial cable. An inductive transformer 70 including a coil 71 and outer housing 75 is placed in the saddle 24 of the head 23. The most preferable saddle is shaped to conform to the outer housing contour thus providing significant surface area contact. A terminal end 72 of the coil 71 is in electrical communication with the outer housing 75, welding the two parts together being the preferred method of creating the electrical communication.

A portion of the coil 71 becomes the coaxial center conductive core 85 that passes through the head 23, tube 21 and out the second end (not shown) of the coaxial cable connector. The coaxial center conductor is then placed in electrical communication with the conductive core 85 of the coaxial cable 80. The electrical communication is made as the second end of the tube 21 of coaxial cable connector 20 is inserted into the conductive tube 83 of coaxial cable 80. The head 23 could be diametrically larger than the tube 21 and the conductive tube 83 of coaxial cable 80. This would stop the coaxial connector 21 from being inserted into the coaxial cable beyond a certain point. FIG. 8 is an underside perspective view of FIG. 7 depicting the same features as discussed above. The shape of saddle 24 is clearly shown to conform to the contour of the outer housing 75 of the inductive transformer 70. Welding the saddle 24 to the outer housing 75 gives the added benefit of essentially creating a one-piece part. This is easier for handling and allows the assembly of the inductive transformer into a drilling tool and the insertion of the coaxial cable connector into a coaxial cable in the same drilling tool, to be accomplished in one operation.

Figure 9:
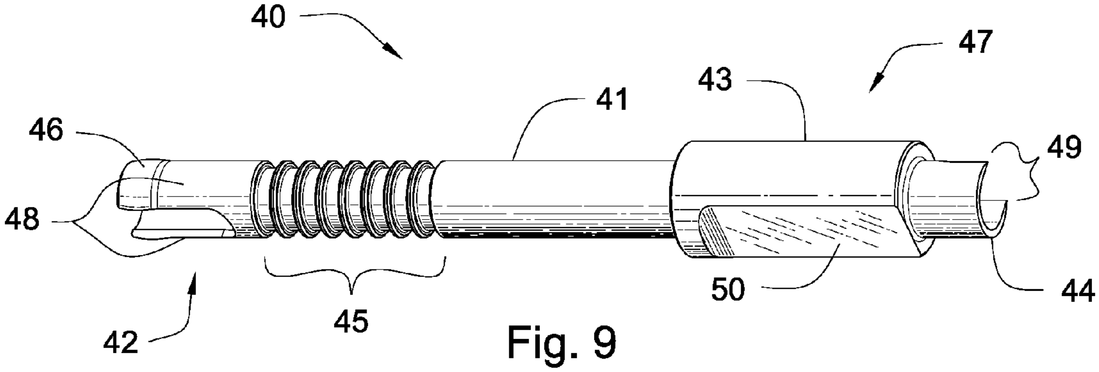
FIG. 9 is a side view of a second embodiment of the invention.

Another embodiment of the same invention is depicted in FIGS. 9 through 12. FIG. 9 shows a side view of a coaxial cable connector 40 with altered features. A tube 41 with a first end 47 and a second end 42 forms the coaxial cable connector 40. An embankment of grooves 45 along the tube 41 are used to house sealing mechanisms such as o-rings. The second end 42 includes a plurality of pliant tabs 48 including a bulbous portion 46 on the tabs. The head 43 is on the first end 47 with the head adapted to be in electrical communication with the inductive transformer. A flat sidewall 50 is formed on the head 47. A protuberance 44 extends from the head 43 including a cut away portion 49. The advantages of these features will be explained in the discussion below and shown in the remaining drawings.

Figure 11:
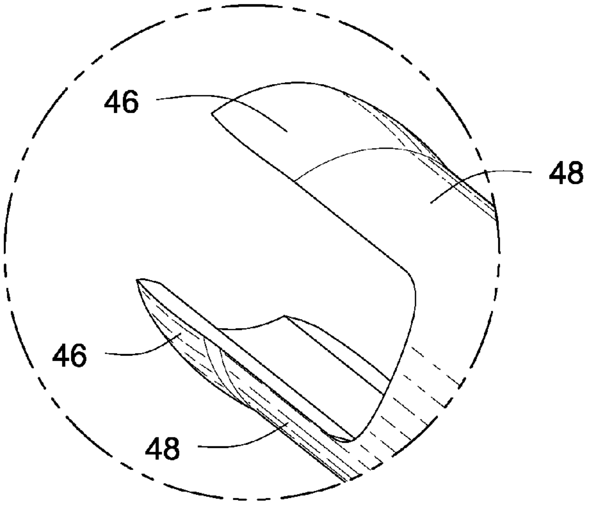
FIG. 11 is a close up view of the second end of the coaxial cable connector as shown in FIG. 10.
Figure 10:
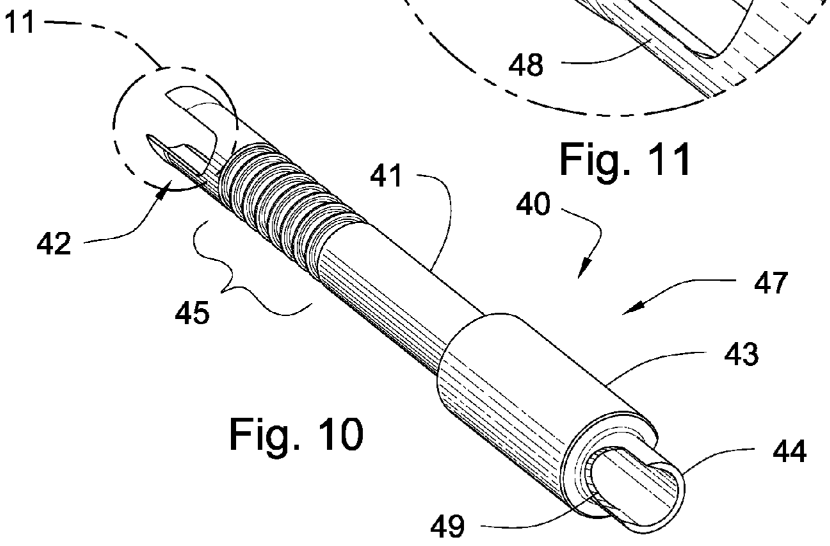
FIG. 10 is a perspective view of a second embodiment of the invention as shown in FIG. 9.

FIG. 10 shows a perspective view of coaxial cable connector 40 from the opposite side as shown in FIG. 9. A cut away portion 49 is formed in protuberance 44. A close up 11 of the second end 42 is shown in FIG. 11. It is desirous for the bulbous portion 46 of the pliant tabs 48 to be larger in diameter than the internal diameter of the conductive tube 83 of the coaxial cable 80 into which the connector will be inserted.

Figure 12:
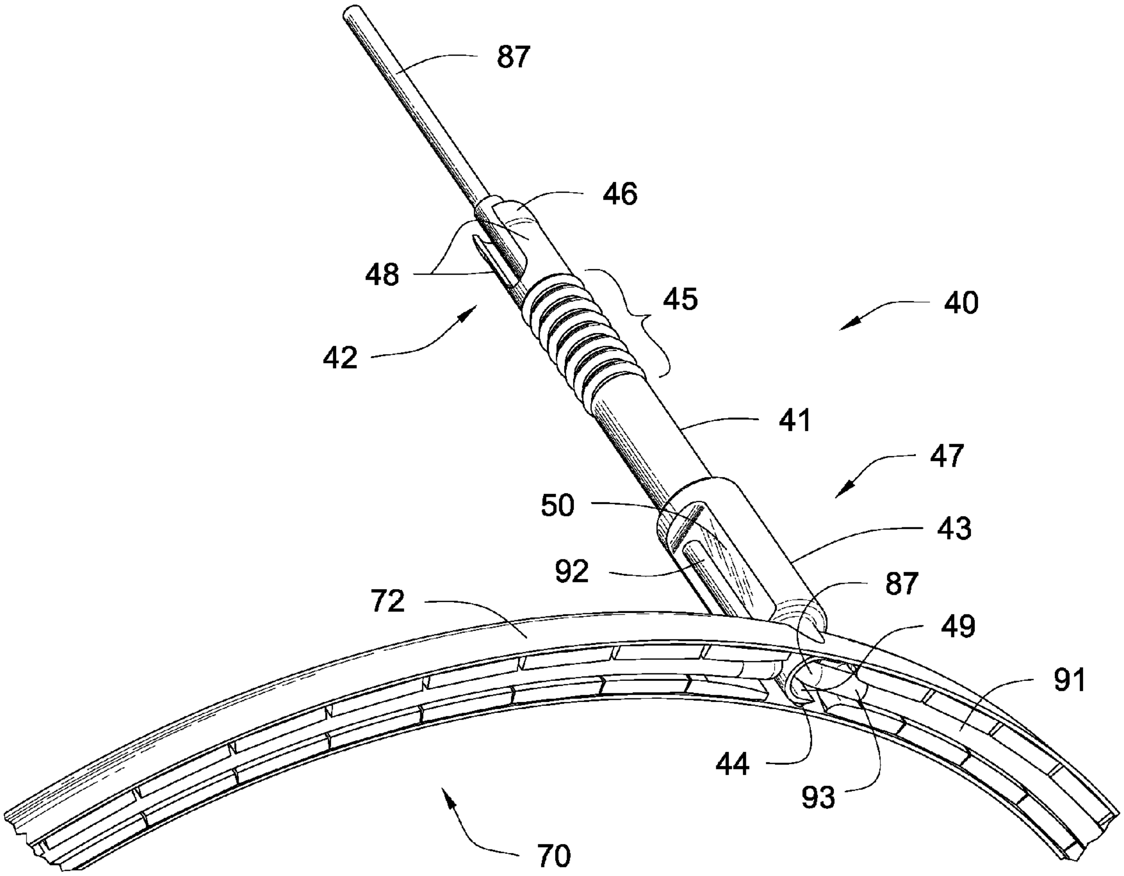
FIG. 12 is a perspective view of an inductive transformer and a second embodiment of the invention.

FIG. 12 shows how this embodiment of the invention as connected to the inductive transformer. The coaxial cable is not shown because the method of connection is the same as the previously discussed embodiments. An inductive transformer 70 with a coil 91 and outer housing 72 is in electrical communication with the coaxial cable connector 40. A terminal end 92 of the coil 91 is in electrical communication with the flat sidewall 50, the preferred method of which is welding the terminal end 92 to the flat sidewall 50. A coaxial center conductor 87 passes through the cut away portion 49 of the protuberance 44 on the head 43. The center conductor 87 continues through the tube 41 and out the second end 42. The coaxial center conductor 87 is preferably a portion of the coil 91. The remaining features such as the pliant tabs 48 including the bulbous portion 46 and grooves 45 are inserted into a coaxial cable as previously shown in the other embodiments.

Many types of data sources are important to management of a drilling operation. These include parameters such as hole temperature and pressure, salinity and pH of the drilling mud, magnetic declination and horizontal declination of the bottom-hole assembly, seismic look-ahead information about the surrounding formation, electrical resistivity of the formation, pore pressure of the formation, gamma ray characterization of the formation, and so forth. The high data rate provided by the present invention provides the opportunity for better use of this type of data and for the development of gathering and use of other types of data not presently available.

Whereas the present invention has been described in particular relation to the drawings attached hereto, it should be understood that other and further modifications apart from those shown or suggested herein, may be made within the scope and spirit of the present invention.

It is therefore intended that the foregoing detailed description be regarded as illustrative rather than limiting, and that it be understood that it is the following claims, including all equivalents, that are intended to define the spirit and scope of this invention.

What is claimed is:

1. A downhole tool comprising:

a coaxial cable connector for electrically connecting an inductive transformer with a coaxial cable, the connector comprising a tube and a generally coaxial center conductor, the tube comprising a first end and a second end, a head on the first end, the head in electrical communication with inductive transformer, the second end in electrical communication with an internal diameter of a conductive tube of the coaxial cable, the inductive transformer and the coaxial cable disposed within the downhole tool;

the coaxial center conductor passing through the tube, electrically insulated from the tube, and electrical communication with a coil in the inductive transformer and a conductive core of the coaxial cable, wherein the second end of the coaxial cable connector forms a plurality of bulbous pliant tabs extending from the tube.

2. The downhole tool of claim 1 wherein the head is diametrically larger than the tube.

3. The downhole tool of claim 1 wherein an outer diameter of the bulbous pliant tabs is larger than the internal diameter of the coaxial cable into which a terminal end is inserted.

4. The downhole tool of claim 1 wherein the coaxial cable connector head forms a saddle, the saddle shaped to conform to an outer housing of the inductive transformer.

5. The dowohole tool of claim 4 wherein the saddle is welded to the outer housing of the inductive transformer.

6. The downhole tool of claim 1 wherein the coaxial cable connector head has an outer flat sidewall.

7. The downhole tool of claim 6 wherein a terminal end of the coil in the inductive transformer is welded to the coaxial cable connector outer flat sidewall.

8. The downhole tool of claim 1 wherein the coaxial cable connector head has an open ended protuberance, a portion of the open ended protuberance cut away, the coaxial center conductor passing through the cut away portion of the open ended protuberance.

9. The downhole tool of claim 1 wherein the coaxial cable connector tube has grooves adapted to house a sealing mechanism.

10. The dowahole tool of claim 9 wherein the sealing mechanism comprises o-rings.

11. The downhole tool of claim 1 wherein the coaxial cable connector is made of a metal.

12. The downhole tool of claim 11 wherein the metal is selected from the group consisting of steel, titanium, chrome, nickel, aluminum, iron, copper, tin, and lead.

13. The downhole tool of claim 12 wherein the metal is steel is selected from the group consisting of viscount 44, D2, stainless steel, tool steel, and 4100 series steels.

* * * * *